United States Patent [19]
Burke et al.

[11] Patent Number: 5,429,110
[45] Date of Patent: Jul. 4, 1995

[54] MOBILE PELLET STOVE WITH THERMAL BARRIER AND VENTILATED FIREPOT

[75] Inventors: Terrence M. Burke; Lawrence T. Burke, both of Placerville, Calif.

[73] Assignee: TSD Industries, Inc., Calif.

[21] Appl. No.: 303,657

[22] Filed: Sep. 9, 1994

[51] Int. Cl.⁶ ............................ A47J 37/00; F24B 3/00
[52] U.S. Cl. .................................... 126/25 R; 126/68; 126/73; 110/233; 110/110; 110/297; 99/447
[58] Field of Search ............... 126/41 R, 39 R, 25 R, 126/73, 68, 10, 67, 7; 110/110, 297, 233, 102; 99/447, 476, 450, 482

[56] References Cited

U.S. PATENT DOCUMENTS

| | | |
|---|---|---|
| 652,531 | 6/1900 | Carlson . |
| 1,779,453 | 10/1930 | Taylor . |
| 2,444,985 | 7/1948 | Fulton .................... 110/33 |
| 3,223,077 | 12/1965 | Taskos .................... 126/25 |
| 3,279,452 | 10/1966 | Hottenroth et al. ............ 126/25 |
| 3,474,725 | 10/1969 | McLaren ...................... 37/8 |
| 3,693,791 | 8/1972 | Rast ........................ 99/340 |
| 3,809,056 | 5/1974 | Snelling .................. 126/59.5 |
| 3,882,767 | 5/1975 | Oyler ...................... 99/339 |
| 3,982,522 | 9/1976 | Hottenroth et al. ............ 126/2 |
| 4,362,093 | 12/1982 | Griscom .................... 99/339 |
| 4,495,860 | 1/1985 | Hitch et al. ............... 99/340 |
| 4,565,184 | 1/1986 | Collins et al. .............. 126/368 |
| 4,572,062 | 2/1986 | Widdowson ................... 99/345 |
| 4,619,209 | 10/1986 | Traeger et al. .............. 110/110 |
| 4,679,543 | 7/1987 | Waltman et al. ............. 126/41 R |
| 4,700,618 | 10/1987 | Cox ........................ 99/339 |
| 4,721,037 | 1/1988 | Blosnich ................... 99/482 |
| 4,823,684 | 4/1989 | Traeger et al. .............. 126/73 |
| 5,123,360 | 6/1992 | Burke et al. ................ 126/73 |
| 5,133,266 | 7/1992 | Cullen .................... 110/110 |
| 5,243,963 | 9/1993 | Riener ...................... 126/73 |
| 5,251,607 | 10/1993 | Traeger et al. ............ 126/25 R |
| 5,359,945 | 11/1994 | Buckner et al. ............ 110/110 |

*Primary Examiner*—James C. Yeung
*Attorney, Agent, or Firm*—David Pressman

[57] ABSTRACT

A pellet stove or grill includes a housing (10) divided by a thermal barrier (43), which is defined by a spaced pair of partitions (20, 21), into a hot compartment (23) and a cold compartment (47). The hot compartment includes a ventilated firepot (44) suspended within an air channel (40) that communicates with the cold compartment through the thermal barrier. The cold compartment is subdivided by a funnel (22) into a fuel pellet storage compartment (24) thereabove and an electrical compartment (25) therebelow. The electrical compartment includes a motorized, fuel conveyer (37) for feeding fuel pellets (31) from the storage compartment, down a chute (38) that extends through the thermal barrier, and into the firepot in the hot compartment for combustion. The chute includes a portion that is positioned within and communicates with the thermal barrier. An air blower (34) drives fresh air into the electrical compartment and into the thermal barrier through an aperture (50) in one of the partitions. The air is conducted directly from the thermal barrier into the chute and then into the hot compartment. Thus air is continuously being circulated through the thermal barrier to cool it, thereby insulating the cold compartment, which stores the fuel pellets and houses the electrical components, from the heat generated in the hot compartment.

20 Claims, 2 Drawing Sheets

MOBILE PELLET STOVE WITH THERMAL BARRIER AND VENTILATED FIREPOT

BACKGROUND

1. Field of Invention

This invention relates generally to pellet stoves, specifically to a portable pellet stove with improved air flow and insulation.

2. Prior Art

Pellet stoves are combustion devices that burn small pellets of wood-based fuel with very high heat content; the heat generated is typically used for space heating or cooking.

Our U.S. Pat. No. 5,123,360 (1992); as well as U.S. Pat. No. 4,619,209 to Traeger et al. (1986); U.S. Pat. No. 4,565,184 to Collins et al. (1986); and U.S. Pat. No. 3,223,077 to Tsakos (1965), show pellet stoves with a storage bin for holding a supply of fuel pellets, and a motor-driven auger or screw conveyer for feeding the pellets at a predetermined rate into a firepot or burner for combustion.

In the Collins, Tsakos, and Traeger devices, a horizontal pellet conveyer terminates at the base of the firepot, so that the distal end of the conveyer is in contact with the combustion zone. Therefore these stoves require long distances between the combustion zone and heat sensitive components, such as the fuel bin and feed motor, for safe thermal separation, and long feed conduits to connect them. As a result, these stoves are too large to be truly portable. These stoves also show air blowers for supplying fresh air through the combustion area. However, the air is directed across the top or the sides of the fuel pile in the firepot, so that the lower or inner areas of the fuel pile therein will not receive enough air for efficient combustion. In the Collins device, the bottom of the fuel bin is separated from the hot combustion area by a single-layered wall, so that the stored fuel may get dangerously hot. Furthermore, the air blower that exhausts the hot gases is subjected to very high temperatures, so that its reliability may also be reduced.

Our patent shows a blower for directing air through the firepot from a perforated bottom thereof for efficient combustion. The screw conveyer is separated from the firepot by a short chute, so that it is not in direct contact with the burning fuel. The conveyer is also kept cool by forced-air flowing from the chute. Although the air flowing through the chute follows a contorted path through the small spaces between the fuel pellets in the storage bin and the screw conveyer, the speed of the flow may be high enough for sufficient cooling when the fuel is in such close proximity to the combustion zone. However, the stove has only a single-layered barrier between the firepot and the compartment housing the electrical components, which may not be sufficiently insulated from the heat, in some cases.

These and all other prior-art pellet stoves either have conveyers that are exposed directly to the burning fuel, or do not provide enough air flow to the fuel pellets for efficient combustion, in some cases. Additionally, some do not sufficiently insulate the electrical components from the heat of combustion, some require such long spatial separations between the combustion zone and the other components so as to make the stoves too large to be portable, some have firepots that are permanently mounted and cannot be removed for cleaning, and some use long feed conduits that make the stoves too large to be truly portable.

OBJECTS AND ADVANTAGES

Accordingly, several objects and advantages of the invention are to provide an improved pellet stove or grill; to provide a pellet stove which provides enough airflow into a firepot for efficient combustion; which insulates the stored fuel and electrical components from heat; which actively cools its internal components to further ensure safety and reliability despite close proximity to the combustion zone; and which is compact and portable, so that it can be used anywhere outdoors.

Other objects and advantages of the invention are to provide a pellet stove which can be conveniently used for cooking or grilling; which can use a variety of wood pellets for giving food different smoke flavors; which is easy to start; which provides even heating; which automatically feeds fuel from a stored supply for prolonged use; which prevents drips from reaching the burning fuel; and which can be easily cleaned.

Further objects and advantages will become apparent from a study of the following description and the accompanying drawings.

SUMMARY OF THE INVENTION

A pellet stove or grill includes a motor-driven conveyer that meters fuel pellets from a storage compartment. The pellets are directed by a gravity chute into a firepot for combustion under a cooking grill. The firepot is positioned near the bottom of a compartment that is insulated from the storage compartment and the electrical components by a doubled-layered wall or thermal barrier. An air blower draws in fresh air to cool the electrical components of the stove and the thermal barrier, and also directs it into the firepot through ventilation holes therein for optimizing combustion efficiency. Due to its construction and air flow arrangement, the stove can be made smaller, lighter, and portable.

BRIEF DESCRIPTION OF THE DRAWING FIGURES

Drawing Reference Numerals

| | |
|---|---|
| 10. Housing | 11. Front Wall |
| 12. Rear Wall | 13. Bottom |
| 14. Right Wall | 15. Left Wall |
| 16. Cover | 17. Pivots |
| 18. Hood | 19. Hinges |
| 20. Partition | 21. Partition |
| 22. Funnel | 23. Hot Compartment |
| 24. Fuel Storage Compartment | 25. Electrical Compartment |
| 26. Support Pegs | 27. Grill |
| 28. Support Pegs | 29. Drip Pan |
| 30. Holes | 31. Fuel Pellets |
| 32. Hole | 33. Top Side Of Thermal Barrier |
| 34. Air Blower | 35. Power Supply Circuit Board |
| 36. Socket | 37. Conveyer |
| 38. Chute | 39. Fuel Feed Motor |
| 40. Air Channel | 41. Closed End |
| 42. Aperture | 43. Thermal Barrier |
| 44. Firepot | 45. Ventilation Holes |

| | |
|---|---|
| 46. Vents | 47. Cold Compartment |
| 48. Power Selector Switch | 49. Fuel Feed Motor Switch |
| 50. Aperture | 51. Hole |
| 52. 12VDC Electrical Cord | 53. Optional Fire Rocks |
| 54. 120VAC Electrical Cord | |

DESCRIPTION

Figure 1:
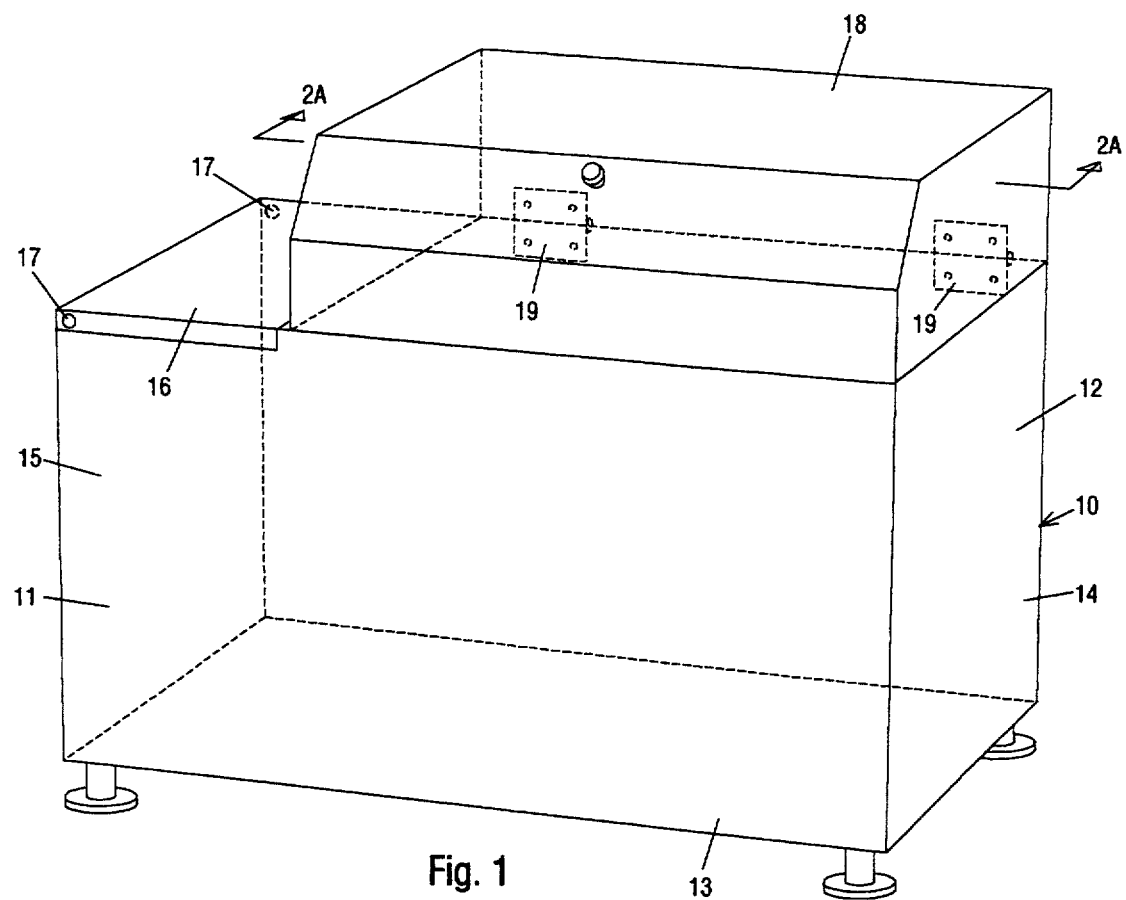
FIG. 1 is a front perspective view of a pellet stove in accordance with a preferred embodiment of the invention.

FIG. 1—Front Perspective View

In accordance with a preferred embodiment of the invention as shown in the front perspective view in FIG. 1, a pellet stove includes a sheet-metal housing 10 having a front wall 11, a rear wall 12, a bottom 13, and fight and left side walls 14 and 15, respectively. A cover 16 is hingably attached to housing 10 with a pair of pivots 17 on its left side, and a hood 18 is hingably attached to housing 10 with pair of hinges 19 on its rear side. In one preferred embodiment, the overall dimensions of the stove are about 61 cm wide, 36 cm high, and 31 cm deep, with all other dimensions (FIG. 2) sized approximately according to the proportions indicated.

DESCRIPTION

Figure 2:
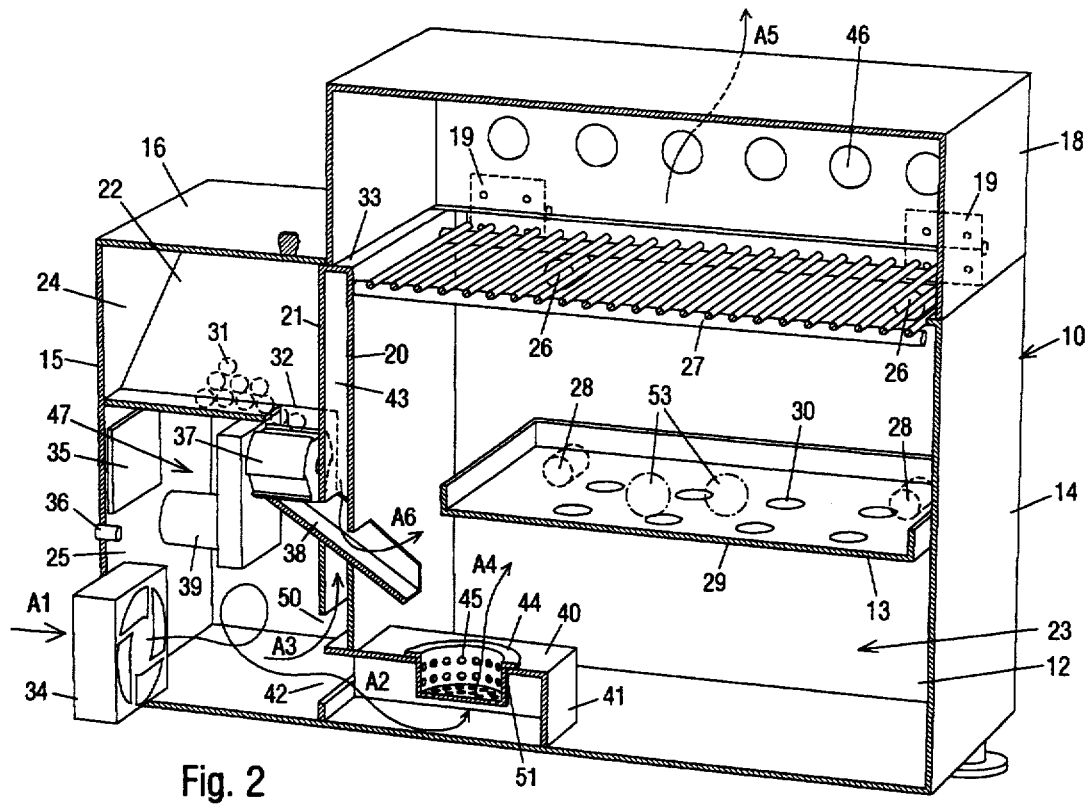
FIG. 2 is a partial cutaway view of the pellet stove taken along line 2A—2A in FIG. 1.

FIG. 2—Cutaway View

In the cutaway view shown in FIG. 2, the internal components of the pellet grill are shown. Except for hood 18, everything is symmetrical about the sectioning plane. Some components are shown without being sectioned for clarity.

Arranged in housing 10 is an air gap or thermal barrier 43, which is defined by a pair of parallel. spaced-apart vertical partitions 20 and 21 connected by a top side 33. Thermal barrier 43 divides housing 10 into a hot side or hot compartment 23, and a cold side or cold compartment 47, which is further subdivided by a dividing member or funnel 22 into a fuel pellet storage compartment 24 thereabove and an electrical compartment 25 therebelow.

Hot compartment 23 includes a set of four support pegs 26 (two shown) for supporting a cooking grill 27. Another set of four support pegs 28 (two shown) support a drip pan 29 with ventilation holes 30 therein. Grill 27 substantially spans the width and depth of hot compartment 23, but drip pan 29 is smaller in width so that it can be slidably adjusted sideways. Fuel pellet storage compartment 24 stores a supply of fuel pellets 31. Funnel 22 includes a hole 32 on its bottom side, and hood 18 includes a series of vents 46 arranged on its back side.

Electrical compartment 25 contains a 12 VDC impeller or air blower 34, a 120 VAC-to-12 VDC power supply circuit board 35, and a 12 VDC electrical socket 36 mounted on left wall 15. A rotor or conveyer 37 is mounted at the upper end of a gravity chute 38 that extends through thermal barrier 43. Conveyer 37 includes a rotor which has conventional fins (not shown) for conveying pellets around from storage compartment 24 to the top of chute 38. A 12 VDC motor 39 with reduction gearing is mounted behind conveyer 37 for rotating it about a horizontal axis. A removable, tubular air channel 40 having a closed distal end 41 extends from partition 21, through partition 20, and into hot compartment 23. Air channel 40 communicates with electrical compartment 25 through an aperture 42 in partition 21. Electrical compartment 25 also communicates with thermal barrier 43 via an aperture 50 positioned above aperture 42. A cast-iron combustion container or firepot 44, which has ventilation holes 45 arranged on its bottom and side, is removably suspended in a hole 51 on a top side of air channel 40.

DESCRIPTION

Figure 3:
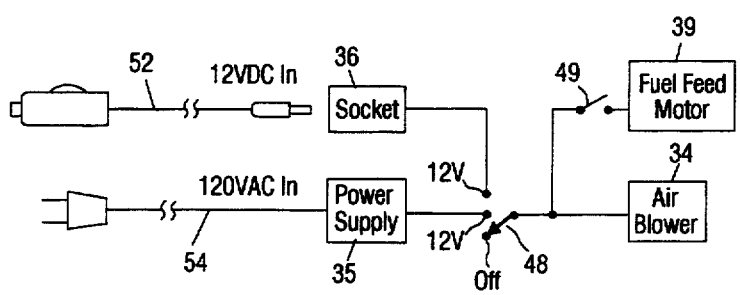
FIG. 3 is an electrical block diagram of the pellet stove.

FIG. 3—Block Diagram

As shown in the electrical block diagram of the pellet stove in FIG. 3, a three-position selector switch 48 is used to determine if air blower 34 and fuel feed motor 39 are to be energized from a domestic 120 VAC source which is stepped down to 12 VDC by a conventional power supply 35, or an external 12 VDC source—a vehicle battery or a solar panel—connected to socket 36. For connection to a vehicle battery, a cord 52 with a cigarette lighter plug at one end is plugged into the vehicle's cigarette lighter socket, and a two-pole small plug on the other end is plugged into socket 36. For energization from a 120 VAC source, a cord 54 with a conventional plug on one end extends from power supply 35. Selector switch 48 is shown in the "off" position. Air blower 34 is turned on whenever selector switch 48 is positioned to receive power (12 VDC from a 120 VAC source or 12VDC from a battery). Fuel feed motor 39 is controlled by an additional on/off switch 49, so that it can be turned off even when air blower 34 remains turned on.

OPERATION

FIGS. 2 and 3

To use the pellet stove, grill 27 and drip pan 29 are first removed from housing 10. An even layer of pellets (not shown) are manually placed into the bottom of firepot 44; any one of a variety of commercially available types of pellets can be used, including flavored ones, such as hickory, mesquite, apple, olive, etc., that will give the food a delicious smoke flavor. Wood starter chips or shavings (not shown) are placed over the pellets until firepot 44 is half full. Fuel storage compartment 24 is also filled with pellets 31. Switches 48 and 49 are turned off, then power supply 35 is connected to a 120 VAC source, such as a domestic power socket. If 120 VAC is not available, such as at campgrounds or parks, an external 12 VDC source, such as a car battery (not shown), or a suitable solar panel (not shown), can be connected to socket 36 by cord 52 or any other suitable cord. The starter chips are lit, and the fire is allowed to develop properly. Grill 27 and drip pan 29 are replaced into housing 10; drip pan 29 should be centered in the middle of hot compartment 23.

Switch 48 is moved to select either 120 VAC or 12 VDC, depending on what power source is used, to energize air blower 34. Fresh, cool air A1 is thus drawn in from the outside to slightly pressurize electrical compartment 25 and cool the components housed therein. The pressurized air inside electrical compartment 25 enters air channel 40 via aperture 42 as airflow A2, and it also enters thermal barrier 43 via aperture 50 as airflow A3. Airflow A2 enters firepot 44 via ventilation holes 45 to provide a continuous flow of oxygen to the fuel pellets (not shown) for combustion. Because ventilation holes 45 are distributed all over the bottom and side of firepot 44, fresh air is circulated all around the fuel pellets (not shown) therein for the most efficient combustion.

Superheated air A4 from combustion in firepot 44 travels up to drip pan 29 and through holes 30 therein to evenly heat and cook food (not shown) placed on grill 27, then finally exits hood 18 through vents 46 as exhaust A5. Hood 18 can be left opened during cooking if desired. Airflow A3 circulates throughout the interior of thermal barrier 43 before exiting therefrom through chute 38 as airflow A6 to keep thermal barrier 43 and chute 38 cool. Therefore electrical compartment 25 and fuel pellet storage compartment 24 are safely insulated from the heat. despite their close proximity to hot compartment 23. As a result, the pellet stove can be made lighter, more compact and portable, but without compromising safety and reliability. Because airflow A6 is conducted directly from thermal barrier 43 into chute 38, without going through other apertures and compartments like the prior-art stoves, airflow resistance is minimized.

About 30 seconds after air blower 34 is turned on, switch 49 can be activated to energize fuel-feed motor 39, which turns conveyer 37 at about 1.5 RPM for wood pellets. For less dense pellets with lower thermal energy content, the speed shall be increased (or the fins on conveyer 37 made deeper); whereas for more dense pellets with higher thermal energy content, the speed shall be decreased (or the fins made shallower). Conveyer 37 slowly but automatically feeds fuel pellets 31 down chute 38 and into firepot 44 to continuously replenish its fuel supply at a suitable rate. If fuel storage compartment 24 is filled when operations begin, the fire can be automatically sustained for many hours.

After the fire is first started, it may be necessary to turn motor 39 on and off to interrupt and limit the fuel feed to allow the fire to build and be sustained properly. If conveyer 37 becomes jammed, its rotation can be reversed to unjam it by partially disassembling housing 10, and reversing the polarity of the electrical connections (not shown) to motor 39. When the fire is burning properly, hood 18 should be closed for about five minutes to heat grill 27 before cooking begins. During cooking, drip pan 29 will collect drips from the food to keep the bottom of housing 10 clean. Optional fire rocks 53—ordinary rocks or stones—can be spread over drip pan 29 for retaining and spreading heat evenly throughout the surface of grill 27. Alteratively, drip pan 29 can be removed for more direct heating. When cooking is finished, motor 39 and blower 34 are turned off. When the components cool to handling temperatures, grill 27, drip pan 29, air channel 40, and firepot 44 can all be easily removed for cleaning.

CONCLUSION, RAMIFICATIONS, AND SCOPE

Accordingly the reader will see that we have provided an improved pellet stove. It conducts enough airflow into a firepot for efficient combustion: it fully insulates the fuel pellets stored in a storage compartment from the heat; it actively cools its electrical components to ensure safety and reliability, despite the close proximity of the combustion zone; it can be conveniently used for cooking; it can use a variety of wood pellets to give food different smoke flavors or campfire tastes; it is easy to start; it provides even heating; it can automatically feed fuel from a large supply for prolonged use; it is portable and it can use either 120 VAC or 12 VDC power so that it can be used in backyards, parks, and campgrounds; it prevents drips from reaching the burning fuel; and it can be easily cleaned.

Although the above descriptions are specific, they should not be considered as limitations on the scope of the invention, but only as examples of the preferred embodiment. Many additional ramifications and variations are possible within the teachings of the invention. For example, 120 VAC (or 240 VAC - European) versions of the fuel feed motor and air blower can be used, so that the built-in power supply can be eliminated. The motor driving the fan at a high rotational speed can also be geared down to drive the conveyer at its low rotational speed, so that one motor can be eliminated. Instead of a rotor, a screw conveyer (auger) can be used. The circuitry can be changed, e.g., a switching-Socket can be used, so that the built-in power supply is normally connected to the motor and air blower, but when a DC plug is received in the socket, it will automatically disconnect the power supply and switch over to DC; instead of a built-in power supply, an external AC-to-DC adapter can be used. Instead of having a single cylindrical side wall, the firepot can be of other shapes, such as rectangular, so that it may have several planar side walls. The air blower can circulate air through the stove by either drawing in or exhausting air by simply changing its orientation and mounting location. Additional fans or blowers can be installed to further enhance airflow. The pellet stove can be used for space heating by adding suitable conduits for venting its combustion gases to the outside of a building. Therefore the scope of the invention should not be determined by the examples given, but by the appended claims and their legal equivalents.

We claim:

1. A stove for converting fuel to heat, comprising: a housing, a thermal partition means comprising first and second parallel, spaced-apart vertical walls defining a thermal barrier therebetween, said thermal partition means arranged within said housing and dividing said housing into a hot side for receiving and burning said fuel therein to produce heat, and a cold side insulated from said heat, said second of said walls including an outlet therein for communication between said thermal barrier and said cold side, said cold side including a fuel hopper for holding fuel, a chute extending downwardly from said fuel hopper into said hot side through said thermal barrier, said chute having a portion positioned within and communicating with said thermal barrier and extending into said hot side through said outlet, fuel feeding means mounted in said fuel hopper at an upper end of said chute, said fuel feeding means adapted to feed fuel from said fuel hopper down said chute and into said hot side for combustion, an air blower for supplying fresh air from outside of said stove into said cold side, said thermal partition means dividing all of said air supplied from outside of said stove into said cold side into two portions, a first portion and a second portion, said two portions constituting all of said air supplied from outside said stove, said thermal partition means being arranged to conduct all of said first portion of said air through said thermal partition means into said hot side for enhancing combustion in said hot side, said thermal partition means conducting said second portion of said air into said thermal barrier, said thermal barrier being arranged to force all of said second portion into said chute and through said outlet into said hot side, such that all of said second portion of said air is conducted directly from thermal barrier into said chute and then into said hot side, whereby when said fuel is fed by said fuel feeding means into said hot side and ignited to produce heat, said thermal barrier is cooled by said second portion of fresh air supplied by said air blower, whereafter all of said second portion of said air will be conducted into said hot side, so that said second portion of said air cools said thermal barrier to prevent heat from said hot side from reaching said cold side and all of said air supplied from outside of said stove is ultimately used to enhance combustion in said hot side.

2. The stove of claim 1 wherein said fuel feeding means comprises a motorized conveyor for removing said fuel from said fuel storage hopper and a gravity chute for directing said fuel from said conveyor into said hot side.

3. The stove of claim 1 wherein when said thermal partition means comprises said first wall, said first wall being shorter than said second wall so that said first wall has an open portion at a bottom thereof so that said fresh air supplied from outside said stove into said cold side passes through said open portion into said thermal barrier and into said hot side.

4. The stove of claim 1 wherein said hot side includes a fire pot positioned so that said first portion of air is directed below said fire pot and said second portion of air is directed above said fire pot.

5. The stove of claim 1, further including a grill positioned in said hot side and adapted to receive food thereon for cooking.

6. The stove of claim 5, further including a drip pan positioned under said grill and adapted to catch drips from said food.

7. The stove of claim 6 wherein said drip pan is slidably positionable within said hot side said drip pan adapted to receive fire rocks thereon for spreading and temporarily retaining said heat.

8. A stove for converting fuel to heat, comprising:
a housing,
a thermal partition means comprising first and second parallel, spaced-apart vertical walls defining a thermal barrier therebetween, said thermal partition means arranged within said housing and dividing said housing into a hot side for receiving and burning said fuel therein to produce heat, and a cold side insulated from said heat, said second of said walls including an outlet therein for communication between said thermal barrier means and said cold side, said cold side including a fuel hopper for holding fuel,
fuel feeding means mounted under said fuel hopper for removing said fuel from said fuel hopper.
a chute extending downwardly from said fuel feeding means into said hot side through said thermal barrier, said chute having a portion positioned within and communicating with said thermal barrier, said chute having a distal end extending through said outlet and into said hot side,
a firepot positioned in said hot side under said distal end of said chute,
an air blower for supplying fresh air from an exterior of said stove into said cold side,
said thermal partition means arranged to cause all of said air fed into said cold side to divide into first and second portions, such that said first portion goes through said thermal barrier to said hot side, and said second portion goes into said thermal barrier and thence into said chute and through said outlet so that all of said air supplied from outside said stove will be supplied into said hot side via a first path through said thermal barrier or via a second path into said thermal barrier, into said chute, and through said outlet, whereby when said fuel is stored in said fuel storage hopper, said fuel feeding means feeds said fuel therefrom down said chute and into said firepot, and when said fuel in said firepot is ignited and heat is produced, said thermal barrier is cooled by said fresh air supplied by said air blower, so that said cold side is insulated by the cooled thermal barrier from said heat in said hot side, and all of said air supplied from outside of said stove is ultimately used to enhance combustion in said hot side.

9. The stove of claim 8 wherein said fuel feeding means comprises a motorized rotor.

10. The stove of claim 8 wherein when said thermal partition means comprises said first wall, said first wall being shorter than said second wall so that said first wall has an open portion at a bottom thereof so that said fresh air supplied from outside said stove into said second side passes through said open portion into said thermal barrier and into said hot side.

11. The stove of claim 8, further including a grill positioned in said hot side above said firepot said grill adapted to receive food thereon for cooking.

12. The stove of claim 11, further including a drip pan positioned between said grill and said firepot, said drip pan adapted to catch drips from said food.

13. The stove of claim 12 wherein said drip pan is slidably positionable within said hot side said drip pan adapted to receive fire rocks thereon for spreading and temporarily retaining said heat.

14. A stove for converting fuel to heat, comprising:
a housing,
a thermal partition comprising first and second parallel, spaced-apart vertical walls defining a thermal barrier therebetween, said thermal partition arranged within said housing and dividing said housing into a hot side for receiving and burning said fuel therein to produce heat, and a cold side insulated from said heat, said second wall including an outlet for communication between said thermal barrier and said cold side, said cold side including a fuel hopper for holding fuel,
a chute extending downwardly from said fuel hopper into said hot side through said thermal barrier, said chute having a portion positioned within and communicating with said thermal barrier,
a fuel feeder mounted in said fuel hopper at an upper end of said chute, said fuel feeder arranged to feed fuel from said fuel hopper down said chute and into said hot side for combustion,
an air blower for supplying fresh air from outside of said stove into said cold side,
an aperture in said thermal partition for conducting a first portion of said fresh air supplied to said cold side through said thermal partition into said hot side for enhancing combustion in said hot side,
said first and second vertical walls being shaped and positioned to conduct a second portion of said fresh air, constituting all of the rest of said fresh air other than said first portion thereof, into said thermal barrier, said thermal barrier having only one outlet for said air so that all of said second portion of said air travels down said chute and into said hot side, such that all of said second portion of said air is conducted directly from said thermal barrier into said chute and then into said hot side, such that all of said fresh air from outside of said stove will be supplied either through said thermal partition to said hot side or into said thermal barrier down said chute, and into said hot side whereby when said fuel is fed by said fuel feeding means into said hot side and ignited to produce heat, said thermal barrier is cooled by said second portion of fresh air supplied by said air blower, whereafter all of said second portion of said air will be conducted into said hot side, so that said second portion of said air cools said thermal barrier to prevent heat from said hot side from reaching said cold side and all of said air supplied from outside of said stove is ultimately used to enhance combustion in said hot side.

15. The stove of claim 14 whereto said hot side includes a fire pot positioned so that said first portion of air is directed below said fire pot and said second portion of air is directed above said fire pot.

16. The stove of claim 14 wherein said fuel feeding means comprises a motorized conveyor for removing said fuel from said fuel storage hopper and a gravity chute for directing said fuel from said conveyor into said hot side.

17. The stove of claim 14 wherein said hot side includes a fire pot positioned so that said first portion of air is directed below said fire pot and said second portion of air is directed above said fire pot.

18. The stove of claim 14, further including a grill positioned in said hot side and adapted to receive food thereon for cooking.

19. The stove of claim 18, further including a drip pan positioned under said grill and adapted to catch drips from said food.

20. The stove of claim 6 wherein said drip pan is slidably positionable within said hot side said drip pan adapted to receive fire rocks thereon for spreading and temporarily retaining said heat.

* * * * *

UNITED STATES PATENT AND TRADEMARK OFFICE
CERTIFICATE OF CORRECTION

PATENT NO. : 5,429,110
DATED : July 4, 1995
INVENTOR(S) : T, M. Burke and L. T. Burke It is certified that error appears in the above-indentified patent and that said Letters Patent is hereby corrected as shown below:

Column 1, line 11, change "bum" to --burn--.

Signed and Sealed this

Twenty-sixth Day of September, 1995

Attest:

BRUCE LEHMAN

Attesting Officer      Commissioner of Patents and Trademarks